UNITED STATES PATENT OFFICE.

ELMER E. MOHNEY, OF HUME, CALIFORNIA.

PAINT COMPOSITION.

1,280,067.     Specification of Letters Patent.     Patented Sept. 24, 1918.

No Drawing.     Application filed December 22, 1916. Serial No. 138,461.

*To all whom it may concern:*

Be it known that I, ELMER E. MOHNEY, a citizen of the United States, residing at Hume, in the county of Fresno and State of California, have invented new and useful Improvements in Paint Compositions, of which the following is a specification.

This invention relates to a novel paint composition, and the object of the invention is to provide a paint which may be cheaply manufactured, and which will serve as a preservative paint for coating or covering wood, house roofs, fabrics, wood and iron bridges, pipes and other wooden and metallic objects exposed to the action of the elements or to liability of decay when embedded in the ground.

In carrying my invention into practice, I provide a paint composition composed of the following ingredients, to wit:—

Charred wood (charcoal), finely ground, one part; boiled linseed oil, one to two parts; and drier (Japan or other suitable drier), one to two pints to each gallon of the mixture of oil and charcoal.

The finely ground charcoal is mixed with the linseed oil and the drier by stirring or agitation, whereupon the composition is ready for use. This composition may be applied by means of a brush, or by means of sprayer, or by any of the methods commonly employed for applying paints to surfaces. It may also be applied by dipping the material to be coated therein. I have found in practice that this paint composition possesses great value as a protective coating for wood and metals which are exposed to the elements or buried in the ground, the charcoal possessing filling and preservative properties to a very high degree and also serving to prevent the ravages of insects, as well as electrolytic action upon metallic substances. It is also inexpensive of manufacture and may be made in an easy and convenient manner. Wood coated with this composition will be proof against decay even when buried for a long time in the ground.

I may sometimes employ, as additional constituents for thinning and spreading purposes, turpentine in suitable quantity to thin out the composition as desired.

The paint may also be employed as a waterproofing agent for coating fabric, such as canvas, and if applied properly thinned ouot will form a smooth coating which will not crack when the fabric is bent or folded.

I claim:—

1. A paint composition comprising a mixture of ground charred wood or charcoal, one part, and boiled linseed oil, one to two parts, and a drier, one to two pints to each gallon of the mixture of oil and charcoal.

2. A paint composition comprising a mixture of ground charred wood or charcoal, boiled linseed oil, a drier, and turpentine.

In testimony whereof I affix my signature.

ELMER E. MOHNEY.

Copies of this patent may be obtained for five cents each, by addressing the "Commissioner of Patents, Washington, D. C."